(12) United States Patent
Sato et al.

(10) Patent No.: US 8,355,004 B2
(45) Date of Patent: Jan. 15, 2013

(54) KEYBOARD DEVICE AND ELECTRONIC EQUIPMENT USING SAME

(75) Inventors: Masaaki Sato, Kitasaku-gun (JP); Yasutoshi Obata, Kitasaku-gun (JP)

(73) Assignee: Minebea Co., Ltd, Kitasaku-Gun (JP)

( * ) Notice: Subject to any disclaimer, the term of this patent is extended or adjusted under 35 U.S.C. 154(b) by 289 days.

(21) Appl. No.: 12/916,870

(22) Filed: Nov. 1, 2010

(65) Prior Publication Data

US 2011/0102325 A1    May 5, 2011

(30) Foreign Application Priority Data

Nov. 5, 2009    (JP) .................................. 2009-253938

(51) Int. Cl.
*G06F 3/02* (2006.01)
(52) U.S. Cl. ...................................................... 345/170
(58) Field of Classification Search .................. 345/168, 345/170, 173
See application file for complete search history.

(56) References Cited

U.S. PATENT DOCUMENTS 6,824,321 B2 * 11/2004 Ward et al. ..................... 345/168
8,149,218 B2 * 4/2012 Garfio et al. .................. 345/173

FOREIGN PATENT DOCUMENTS

| JP | A-10-27053 | 1/1998 |
|---|---|---|
| JP | A-2006-65611 | 3/2006 |
| JP | A-2007-164767 | 6/2007 |
| JP | A-2009-212031 | 9/2009 |

* cited by examiner

*Primary Examiner* — Kevin M Nguyen
(74) *Attorney, Agent, or Firm* — Oliff & Berridge, PLC

(57) ABSTRACT

There is provided a keyboard device with a lamination body, the lamination body comprising: a translucent touch panel; a symbol printing film on which arbitrary symbols are printed; a surface emission layer that illuminates the symbol printing film, wherein the touch panel is arranged on an upper surface side of the symbol printing film, the surface emission layer is arranged on a lower surface side of the symbol printing film, and an input operation surface that is placed on the outermost surface of the keyboard device is flat.

13 Claims, 4 Drawing Sheets

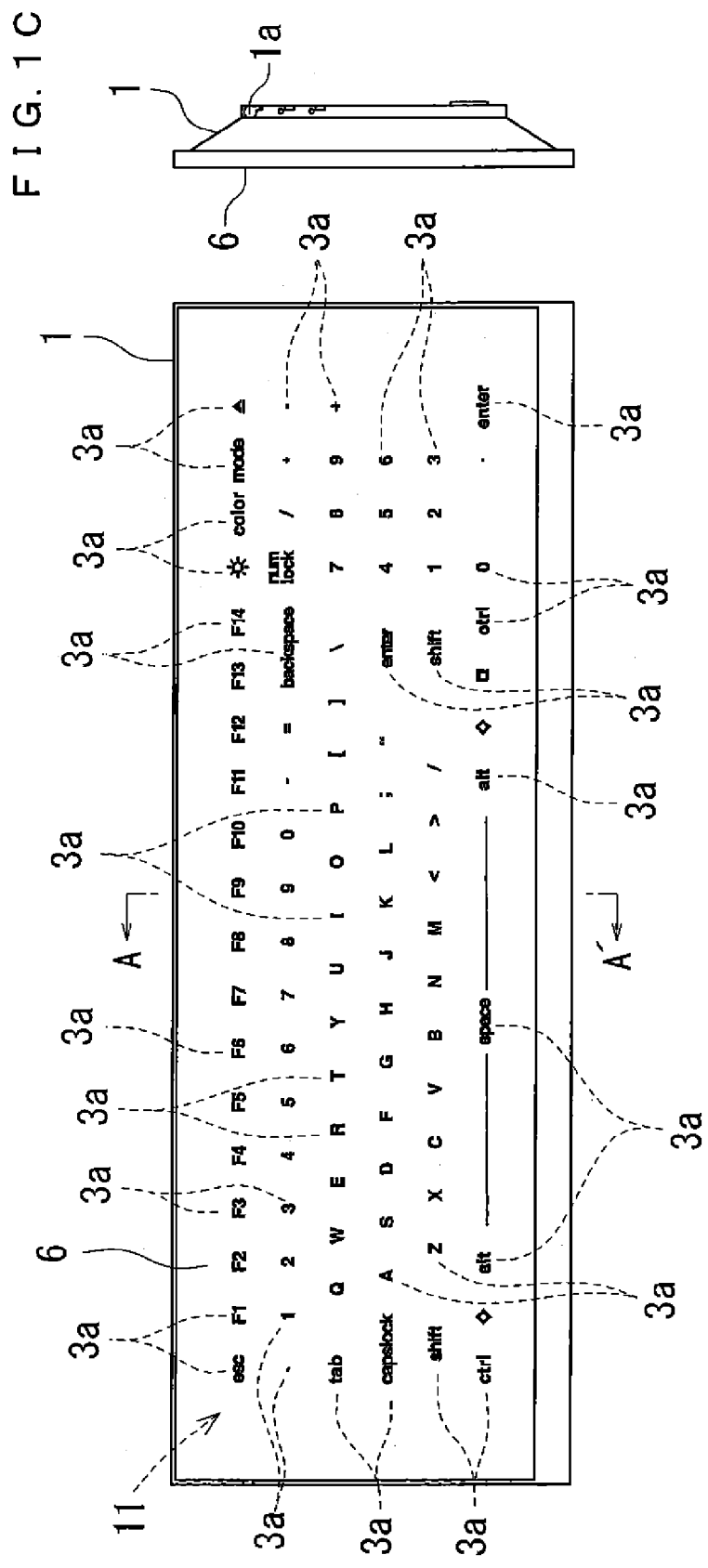

KEYBOARD DEVICE AND ELECTRONIC EQUIPMENT USING SAME

BACKGROUND OF THE INVENTION

1. Field of the Invention

The present invention relates to a keyboard device that performs an information input operation using a touch panel, and a controller for an electronic equipment using the same, the electronic equipment controller being exemplified as a remote controller for a television (hereinafter referred to as the TV remote controller), a desk calculator, etc.

2. Description of the Related Art

A touch panel is a device that is generally arranged on the display screen of an LCD (Liquid Crystal Display), a CRT display, etc. While looking through characters, numerals or some other symbols (Pictographs usually called as icons such as graphics or images are included. A plurality of symbols may constitute a single symbol) from the front surface side of the touch panel, users touch the characters, numerals or some other symbols (hereinafter referred to as the characters) with their fingers, etc. so as to generate and output information corresponding to a position where the users have touched. This type of the touch panel has been well known in the field of ATM (Automated Teller Machine) of a bank, car navigators, etc. Further, the touch panel has also become well used in the field of compact electronic equipments such as portable information terminals, electronic dictionaries, etc.

Here, considering input devices that perform information input operation using the above-described touch panel, it would be structurally necessary that a display device such as an LCD, etc. needs to be arranged at the lower surface side of the input devices, therefore increasing the total cost of the input devices. On the other hand, since the display device is used also as the input devices, it would have an advantage of reducing an occupied space relative to the whole input devices in which to perform display and input of information. Further, it would also make possible to function the input devices as a multiple display device where the symbols displayed on a screen can be sequentially altered as needed. See Japanese Patent Application Laid-open No. H10-27053 (hereinafter referred to as the Japanese Document 1) and Japanese Patent Application Laid-open No. 2007-164767 (hereinafter referred to as the Japanese Document 2). Still further, input devices where an information input operation is performed with application of a touch panel but without application of a display device such as an LCD have been developed. See Japanese Patent Application Laid-open No. 2006-65611 (hereinafter referred to as the Japanese Document 3) and Japanese Patent Application Laid-open No. 2009-212031 (hereinafter referred to as the Japanese Document 4).

However, in the above-described conventional arts, if functions of the multiple display device are not required, it would become not necessary to especially provide the display devices of the LCD, the CRT, and the like. Accordingly, the input devices disclosed in the Patent Document 1 and the Patent Document 2 may go beyond necessary specifications, resulting in a high cost as simple input devices.

Considering the input devices disclosed in the Patent Document 3 and the Patent Document 4 where information input operations are performed with the touch panel but without the display device, it would be possible to reduce costs since no display device is applied. However, as to the input device disclosed in the Patent Document 3, from its upper surface side to its lower surface side, a display sheet (an operational display portion or a symbol printing film), a surface emission layer (or a touch panel) and a touch panel (or a surface emission layer) are laminated in this order. Further, as to the input device disclosed in the Patent Document 4, from its upper surface side to its lower surface side, a base-material film (or a symbol printing film), a touch panel and a surface emission layer are laminated in this order. Based on the structure disclosed in the Patent Document 3 and the Patent Document 4, the following problems have been arisen. That is, considering arrangement of the above laminated structure, in the arrangement where the surface emission layer is placed underneath the touch panel, a signal wiring group of the touch panel becomes easily visible from the top of the input operational surface so as not only to deteriorate visibility of the symbols but also to degrade operationability or an outer appearance of the input devices. Further, operationability of the touch panel has been lowered, so that users need relatively strong touches to the touch panel to be detected.

Moreover, as to the input devices disclosed in the Patent Document 4, the uppermost surface (or the input operational surface) of finished products (the completed input devices) has a convexoconcave surface, making the uppermost surface difficult for cleaning. Especially, at cornered portions on the convexoconcave surface, cleaning has not been satisfactorily performed, resulting in easy adhesion of dust, oil and fat contents, and the like. This causes not only deterioration of the outer appearance of the input devices but also difficulty to keep sanitary conditions in a satisfied manner. Accordingly, the input devices of the above type have not been able to use in medical care fields, clean rooms, etc.

SUMMARY OF THE INVENTION

The present invention has been made in light of the above problem, and it is an object of the present invention to provide a keyboard device and an electronic equipment using the same that especially suitable in the field of medical cares, etc. the keyboard device and the electronic equipment satisfying: being not in an over-specification; achieving a low cost; improving operationability and outer appearance by making the signal wiring group of a touch panel hardly viewable from an input operation surface; keeping operational sensibilities of the touch panel; and obtaining better sanitary conditions with easy cleaning on the input operation surface (the uppermost surface of the device).

In order to achieve the object described above, according to a first aspect of the present invention, there is provided a keyboard device with a lamination body, the lamination body comprising: a translucent touch panel; a symbol printing film on which arbitrary symbols are printed; a surface emission layer that illuminates the symbol printing film, wherein the touch panel is arranged on an upper surface side of the symbol printing film, the surface emission layer is arranged on a lower surface side of the symbol printing film, and an input operation surface that is placed on the outermost surface of the keyboard device is flat.

With the above structure, since the keyboard device is fabricated without a display device such as an LCD, a CRT, etc. that is not requisite of the keyboard device, it would be possible to reduce cost of the keyboard device. Further, since the symbol printing film intervenes between the touch panel and the surface emission layer, light emitted from the surface emission layer is not directly introduced into the touch panel. Accordingly, a wiring group of the touch panel becomes hardly viewable when seen from the upper portion of an input operation surface, contributing to improvement of operationability and an outer appearance of the device. Still further, since this touch panel is arranged on the outermost surface of the laminated body that is composed of the touch panel, the symbol printing film and the surface emission layer, operationability of the touch panel will be enhanced. In addition, because the input operation surface positioned on the outermost surface of the keyboard device is formed to be flat, the input operation surface can be easily cleaned, contributing to remarkable reduction of dirt, improvement of an outer appearance of the device, and maintenance of sanitary conditions.

In the first aspect of the present invention, the keyboard device further comprises a translucent cover panel that laminates to cover an upper surface of the touch panel, an upper surface of the cover panel workable as the input operation surface.

With the above structure, since the upper surface of the touch panel is covered with the translucent cover panel so as to form the input operation surface, it is possible to form the input operation surface (the outermost surface of the keyboard device) without being restricted by the basic structure of the lamination body that is composed of the touch panel, the symbol printing film and the surface emission layer. Accordingly, cleaning would be much easier with the input operation surface sufficiently flat. Further, considering the cover panel applied, not only would it be possible to select various materials, colors, designs, etc., durability or decorability of the input operation surface may be improved.

In the first aspect of the present invention, the cover panel is made of a semi-transparent mirror or a smoke panel.

With the above structure, since the cover panel is fabricated by either the semi-transparent mirror or the smoked panel, when performing input operations, the symbols printed on the symbol printing film are hidden when the surface emission layer is not illuminated (when the keyboard device is not in a usable condition), and become viewable in such a manner that the symbols appear to come closer to users' sides (hereinafter called as "the floating view effect" throughout the specification) when the surface emission layer is illuminated (when the keyboard device is in a usable condition). Compared to a case where the cover panel is just translucent, the present invention can obtain the floating view effect further in an operative manner.

In the first aspect of the present invention, the cover panel is a lamination layer that is composed of a translucent panel and the semi-transparent minor, and the semi-transparent mirror is directed to the side of the touch panel.

With the above structure, since the cover panel is fabricated by laminating the semi-transparent mirror and the translucent panel, it would be possible to select various kinds of the semi-transparent mirror and the translucent panel. Accordingly, compared to a case where the cover panel is formed with only the semi-transparent mirror, it would be possible to variably modify features of the cover panel. Here, the reason that the semi-transparent mirror is arranged to directly toward the side of the touch panel is for protection of the semi-transparent mirror.

In the first aspect of the present invention, the semi-transparent mirror is one made of a dielectric multilayer.

With the above structure, since the semi-transparent mirror is made of a dielectric multilayer (the dielectric multilayer semi-transparent mirror) but not made of a metal film, the touch panel fabricated in an electrostatic capacity method is applicable. Further, in this keyboard device, by making the touch panel being in a non-operative condition while only making the surface emission layer being in an operative condition, it would be possible to obtain a mirror surface that is colored according to features of the dielectric multilayer, contributing to remarkable decorative effects.

In the first aspect of the present invention, the translucent panel is made of either a translucent acrylic sheet or a translucent polycarbonate sheet.

With the above structure, since the translucent panel is fabricated by the acrylic sheet or the polycarbonate sheet that has translucent features, it would be possible to enhance durability, shock resistance and insulating property of the touch panel. Further, it would be also possible to electrically and mechanically protect the semi-transparent mirror, the touch panel, the symbol printing film and the surface emission layer. Still further, by applying the translucent acrylic sheet or the polycarbonate sheet, not only would it be possible to obtain high visibility of the symbols of the symbol printing film, a sufficiently flat surface can be formed. Accordingly, the acrylic sheet or the polycarbonate sheet would be suitable as the translucent panel working as an input operation surface placed on the uppermost surface of the keyboard device.

In the first aspect of the present invention, the symbol printing film is made of a negative symbol printing film where the symbols are printed in a negative condition.

With the above structure, since the symbol printing film is fabricated with the negative symbol printing where the symbols are printed in a negative condition, various symbols (a symbol group) and contours of a printing region of the symbol group can be viewed with the floating view effect, contributing to improvement of visibility and an outer appearance of the device. Further, since all portions except the symbol printing portions (a background area) become a dark color such as black where light is difficult to be transmitted, it would be possible to hide wirings, etc. placed underneath the symbol printing film the negative symbol printing film) or traces of a touch-up that are produced when the symbols are printed.

In the first aspect of the present invention, the touch panel is one fabricated in an electrostatic capacity method.

With the above structure, since the touch panel is fabricated with a touch panel in the electrostatic capacity method, it would be able to structure a touch panel that is superior to translucent abilities compared to, for example, a touch panel in a resistant film method. Accordingly, even if a touch panel is arranged on an upper surface side of the symbol printing film, it can produce a keyboard device that does not deteriorate visibility of the symbols printed on the symbol printing film with relatively easy structures.

In the first aspect of the present invention, the keyboard device further comprises a vibration motor that is sequentially to be operable when detecting users' touch to the touch panel.

With the above structure, since the keyboard device further comprises the vibration motor that sequentially operates when detecting that users' touch to the touch panel, it would be possible to refrain from emanating unnecessary loud noises to their surroundings. Further, because of its vibrating structure, users can easily come into notice that the input operation surface has been touched.

In the first aspect of the present invention, the symbol printing film and the surface emission layer each partially have openings at their portions that face to each other wherein a fluorescent display tube or a liquid crystal display device is installable within a region of the openings making the symbols viewable through the translucent touch panel.

With the above structure, considering the main part of the input operation surface of the keyboard device, it would be possible to achieve all effects identical with the first aspect of the present invention discussed hereinabove. Further, at the opening area, it would be possible to easily obtain effects contributed by the fluorescent display tube or the liquid crystal display device, for example, the modification of contents of the displayed symbols, such as shifting from upper-case letters to lower-case letters and vice versa.

According to a second aspect of the present invention, a keyboard device for a personal computer with the keyboard device used in the first aspect is applied.

According to a third aspect of the present invention, an electronic equipment with the keyboard device used in the first aspect is applied.

According to a fourth aspect of the present invention, desk calculator with the keyboard device used in the first aspect is applied.

With the structures according to the second, third and fourth aspects of the present invention, it would be possible to provide a keyboard device for a personal computer, a controller for an electronic equipment and a desk calculator that can obtain effects of the keyboard device having discussed in the first aspect of the present invention.

BRIEF DESCRIPTION OF THE DRAWINGS

FIG. 1 illustrates a keyboard device according to an embodiment of the present invention where FIGS. 1A, 1B and 1C respectively illustrate a plan view, a front view, and a right-side view;

DETAILED DESCRIPTION OF THE PREFERRED EMBODIMENTS

Figure 2:
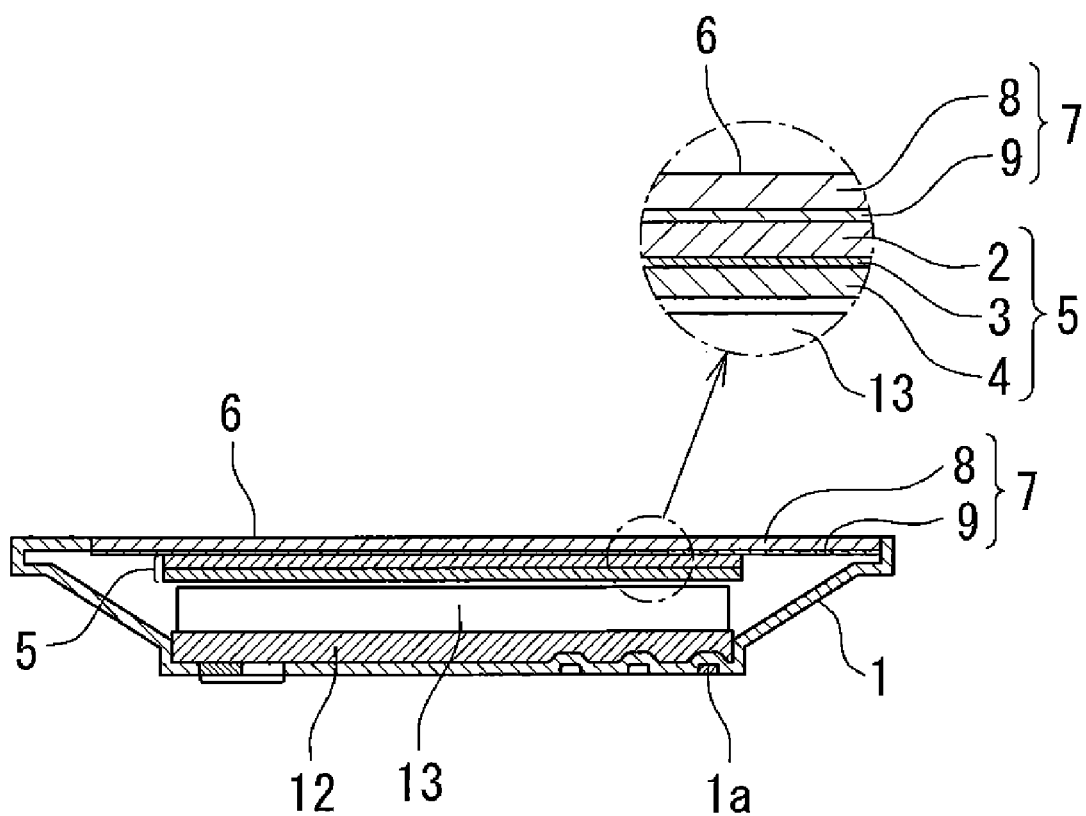
FIG. 2 illustrates an expanded sectional view taken along the line A-A' in FIG. 1A.

Hereinafter, preferred embodiments of the present invention will be explained in reference to the attached drawings. The same referential numerals indicate identical or corresponding portions. FIG. 1 illustrates a keyboard device according to one embodiment of the present invention, specifically a keyboard device for a personal computer where FIG. 1A, FIG. 1B and FIG. 1C respectively illustrate a plan view, a front view and a right-side view. FIG. 2 illustrates a sectional arrow view taken along the line A-A' in FIG. 1A. Further, FIG. 3 typically illustrates the sectional structure in FIG. 2. In FIG. 2, a partially expanded view (area surrounded by an alternate long and short dash line) is also introduced.

Figure 3:
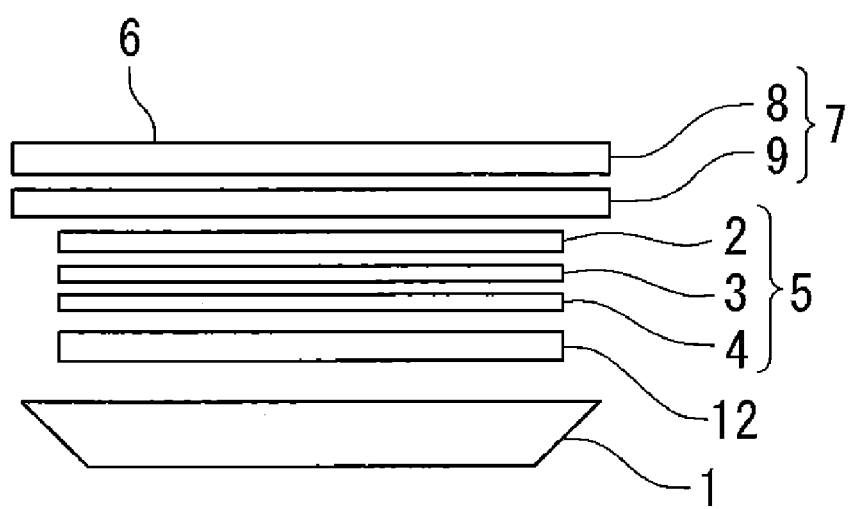
FIG. 3 typically illustrates the sectional structure in FIG. 2.

As shown in FIGS. 1 to 3, the keyboard device according to the embodiment of the present invention is for a keyboard device for a personal computer, the keyboard device being formed into an oblong rectangular shape in a planar view and is provided with a shallow bottom case 1 formed into a countersunk square and approximately a reverse trapezoid in a longitudinal section. The bottom case 1 is fabricated by a synthetic resin molding, for example, an ABS resin molding, the bottom case 1 having a leg portion 1a at its bottom surface. The bottom case 1 houses main elements of the keyboard device that perform an input operation for information (specifically the symbols) through users' contact (hereinafter described in details). More specifically, as shown in FIGS. 2 and 3, within the bottom case 1, a lamination body 5 is housed, the lamination body 5 being composed of: a translucent touch panel 2, a symbol printing film 3 on which arbitrary symbols (see FIG. 1) are printed, and a back light device 4 working as a surface emission layer in which to illuminate the symbol printing film 3. In this case, the touch panel 2 is arranged on the upper surface side of the symbol printing film 3 (arranged on the upper surface in FIGS), and the back light device 4 is placed beneath the symbol printing film 3 (arranged on the lower surface in FIGS). Further, as to the keyboard device according to the embodiment of the present invention, an input operation surface 6 placed on the uppermost surface of the keyboard device is formed to be flat, having no convexoconcave surface.

Fundamental structures of the embodiment of the present invention are as discussed hereinabove; however, the embodiment further includes the following structures. That is, on the upper surface side of the touch panel 2 (on the upper surface of the touch panel 2 according to the embodiment of the present invention), a cover panel 7 which has a translucent character is laminated. This cover panel 7 is fitted and fixed at the upper end portion of an inner-side wall of the bottom case 1 as covering an upper opening of the lower case 1. The cover panel 7 is positioned on the uppermost surface of the keyboard device. That is, since the upper surface of the cover panel 7 works as the input operation surface 6, it must be flat, having no convexoconcave surface.

The cover panel 7 is fabricated by either a semi-transparent mirror or a smoke panel. In addition, the cover panel 7 maybe fabricated by laminating a translucent plate or sheet (hereinafter generally called as the translucent panel) and the semi-transparent mirror. According to the embodiment of the present invention, the cover panel 7 is fabricated by laminating a translucent panel 8 and a semi-transparent mirror 9. The semi-transparent mirror 9 is arranged in a direction toward the side of the touch panel 2. According to the embodiment of the present invention, the translucent panel 8 is made of either a transparent acrylic sheet or a transparent polycarbonate sheet. Further, the semi-transparent mirror 9 is made of, for example, a membrane-like or a film-like semi-transparent mirror and structures the cover panel 7 by being adhered on the translucent panel 8.

The reason of why the semi-transparent mirror 9 is arranged in a direction toward the side of the touch panel 2 (or, the translucent panel 8 is arranged in a direction toward the upper surface side of the keyboard device) is as follows. That is, in case that the translucent panel 8 is arranged in a direction toward the upper surface side of the keyboard device, the uppermost surface or the input operation surface 6 will be the upper surface of the translucent panel 8. Since the acrylic sheet or the polycarbonate sheet that configures the translucent panel 8 is each superior to durability, shock resistance, insulation properties, etc., constitution members of the key board device arranged on the underside of the translucent panel 8 such as the semi-transparent mirror 9, the touch panel 2, the symbol printing film 3, the back light device 4, etc. (especially the semi-transparent mirror 9 and the touch panel 2 positioned near the input operation surface 6) can be mechanically and electrically protected. Further, not only would the acrylic sheet or the polycarbonate sheet be superior to durability, shock resistance, insulation properties, etc. as discussed hereinabove, it is also superior to translucent properties. Accordingly, visibility of the printing symbol 3a placed on the symbol printing film 3 will be excellent even though passed through the semi-transparent mirror 9 and the touch panel 2 placed beneath the translucent panel 8. Still further, by applying the acrylic sheet or the polycarbonate sheet to the translucent panel 8, it would be possible to easily obtain a flat surface having no convexoconcave face. Moreover, the acrylic sheet or the polycarbonate sheet is a material where dust, oil and fat contents, etc. adhered on the surface of the translucent panel 8 can be easily removed. Accordingly, the acrylic sheet or the polycarbonate sheet would be the most suitable material for the translucent panel 8 (a material forming the upper surface of the cover panel 7) that fabricates the input operation surface 6 of the uppermost surface of the keyboard device.

As discussed hereinabove, since the cover panel 7 and the touch panel 2 are translucent, it would be possible to view the symbol 3a that is printed on the symbol printing film 3 placed beneath the touch panel 2 from the uppermost surface of the keyboard device (the input operation surface 6). In case that the cover panel 7 is composed of the translucent panel 8 and the semi-transparent mirror 9, when the back light device 4 is lit, it would be possible to clearly view the symbol 3a that is printed on the symbol printing film 3 from the input operation surface 6 (the uppermost surface of the keyboard device). Here, when the back light device 4 is not lit, the uppermost surface of the keyboard device (the input operation surface 6) will be a mirror surface, giving mirror effects.

In the touch panel 2, users touch a position at which the symbol 3a desired is placed with their fingers while looking through a symbol group 11 printed on the symbol printing film 3 from the front surface side of the touch panel 2. Information (symbols) corresponding to the position where the desired symbol 3a is placed is then produced and outputted. This touch panel 2 will actualize effects as the keyboard device (effects of outputting information corresponding to the symbol 3a that is touched by users) along with a touch panel driving circuit hereinafter explained in detail. According to the embodiment of the present invention, this touch panel 2 is the one in an electrostatic capacity method. As regards the touch panel 2 in the electrostatic capacity method, compared to the other typical touch panel in a resistant film method, it would be possible to easily structure a touch panel having superior translucent capabilities.

Moreover, the semi-transparent mirror 9 is made of a semi-transparent mirror that is composed of a dielectric multilayer (a dielectric semi-transparent mirror). This is for being able to apply a filmy semi-transparent mirror to the touch panel 2 in the electrostatic capacity method. Further, according to the dielectric semi-transparent mirror 9, in case that the keyboard device according to the embodiment of the present invention is not operated as a symbol input device (the touch panel 2 is in non-operating condition), but only the back light device 4 is in an operating condition, it would be possible to obtain a mirror surface that is colored according to properties of the dielectric multilayer placed on the uppermost surface of the keyboard device (the input operation surface 6).

In the symbol printing film 3, the plurality of predetermined symbols 3a (a symbol group 11) are printed at predetermined positions on a translucent base-material film in a positive condition (a positive image) or in a negative condition (a negative image). That is, the symbol printing film 3 means either a positive symbol printing film or a negative symbol printing film. In the embodiment of the present invention, a pattern printing is applied. In the pattern printing, light can be transmitted into only a portion where the symbols 3a are present so as to make the symbols 3a to be appeared with a high brightness. For example, only contours of the symbols 3a are printed, and the background portion (where the symbols 3a are not present) is evenly printed in a dark color such as black (the negative symbol printing film). By applying the negative symbol printing film, only the contours of a printing area of the symbol group 11 (the symbols 3a) that is appeared on a symbol printing film surface can be seen with the floating view effect hereinbefore so as to improve visibility and the outer appearance of the device.

A silk screen printing is suitable as a method in which the symbols 3a are printed. As discussed, in case that the touch panel 2 is applied with the electrostatic capacity method, in order to prevent malfunction of the touch panel 2, the symbols 3a are printed with ink that does not include any metallic material. Printing to the symbol printing film 3 may be performed either on the front surface (on the side of the touch panel 2) or the back surface (on the side of the back light device 4) of the base-material film. Or, the printing may be performed on both sides of the base-material film. Note that, enhancement of the floating view effects discussed hereinabove is possible when printed on the front surface of the base-material film. In addition, further low cost can be achieved when printed on only one side (either the front surface or the back surface) of the base-material film. We have already mentioned that the symbols denote characters, numbers or some other marks. In a keyboard device for a personal computer, the symbols may denote alphabetic characters, function keys, special processing marks, or all kinds of symbols. The symbols are adapted to be arranged according to a predetermined key arrangement.

In the above-described back light device 4 according to the embodiment of the present invention, a side-light back light device composed of LEDs and a light conductive plate is applied. In this case, in order to secure brightness where the symbols are positioned while reducing the number of the LEDs, a pattern is formed on the light conductive plate in such a manner that the back light device 4 is lit only at positions where the symbols 3a are placed. Instead of the side-light back light device discussed hereinabove, it would be possible to apply a back light device composed of an inorganic EL luminous element, contributing to a further thin-typed keyboard device.

Underneath the constitution part that is composed of the cover panel 7, the touch panel 2 in the electrostatic capacity method, the symbol printing film 3 and the back light device 4, a circuit in which to drive the keyboard device according to the embodiment of the present invention is arranged. Here, the circuit is basically composed of: a touch panel driving circuit; a substrate (a circuit substrate) 12 on which a lighting circuit for the back light device (not shown) is mounted; and a battery 13 (an operational battery for the touch panel driving circuit and the back light device 4). In FIG. 3, the battery 13 is not shown. In the touch panel driving circuit, the input operation surface 6 placed on the upper surface of the cover panel 7 and the touch panel 2 work together in order to accomplish functions of the keyboard device. More specifically, the touch panel driving circuit works as an electronic circuit that outputs information corresponding to the symbol 3a touched by users. In other words, by means of a position detecting function of the touch panel 2, the touch panel driving circuit will receive a signal (a positioning signal) on the touch panel 2 that is touched (in more detail, through the input operation surface 6) by users. The positioning signal will then make correspondent to a specific signal that has precedently correlated to the symbol 3a on the surface of the symbol printing film 3. The symbol 3a instructed by the users' touch will then be produced and outputted.

In the touch panel 2 of the electrostatic capacity method, the position on the surface of the touch panel 2 (or the input operation surface 6) that is touched by users is determined by detecting electric signals generated through static electricity. This touch panel 2 in the electrostatic capacity method and the touch panel driving circuit are both conventional technologies. Considering the touch panel 2 in the electrostatic capacity and the touch panel driving circuit (the circuit substrate 12), any types of the touch panel 2 and the touch panel driving circuit may be applicable as long as a position detecting method is in application of electric signals generated by static electricity, and the specific signal correlating to the symbol 3*a* that corresponds to a position on the touch panel 2 (that is instructed by users' touch) is finally outputted.

Although the lighting circuit for the back light device 4 is not shown, the circuit is arranged here on the same substrate with the touch panel driving circuit (the circuit substrate 12). In this case, the wiring, etc. of the lighting circuit for the back light device 4 is structured not to be interfered with position detecting operations of the touch panel 2 in the electrostatic capacity method. The same can be said that the lighting circuit of the back light device 4 is separately arranged from the circuit substrate 12 of the touch panel driving circuit. In the embodiment of the present invention, although not shown, there is provided a vibration motor (Haptics) that is adapted to operate together with detection of users' touch to the touch panel 2. Since unnecessary loud noises are refrain from being emanating to surroundings, users can easily detect that the input operation surface 6 has been touched.

As discussed, according to the embodiment of the present invention, since the keyboard device is structured without a display device such as an LCD or a CRT which is not requisite of the keyboard device by itself, further cost reduction can be achieved. Further, since the symbol printing film 3 is intervened between the touch panel 2 and the back light device 4, compared to a structure where the back light device 4 is arranged beneath the touch panel 2, it becomes difficult to view the wiring group of the touch panel 2 from the input operation surface 6, contributing to improvement of operationability and an outer appearance of the device. Still further, since the touch panel 2 is arranged on the uppermost surface (a laminating position which is the nearest relative to the input operation surface 6) of the lamination body 5 composed of this touch panel 2, the symbol printing film 3 and the back light device 4, compared to a case where the touch panel 2 is arranged beneath the back light device 4, operational sensibilities of the touch panel 2 will be improved. Moreover, since the input operation surface 6 arranged on the uppermost surface of the keyboard device is flat, cleaning can be easily performed. Angle portions of the input operation surface 6 can be thus satisfactorily cleaned, and dust, oil and fat contents, etc. become hardly adherable thereon. This will improve an outer appearance of the device while keeping cleanliness. Accordingly, this touch panel 2 (the input operation surface 6) can be said suitably fit for especially usages of medical fields, a clean room, etc.

In the embodiment of the present invention, since the input operation surface 6 is formed by covering the upper surface of the touch panel 2 with the translucent cover panel 7, the input operation surface 6 (the uppermost surface of the keyboard device) can be fabricated with no restriction of the basic constitution of the lamination body 5 composed of the touch panel 2, the symbol printing film 3 and the back light device 4. Accordingly, cleaning of the input operation surface 6 becomes more easy by making the input operation surface sufficiently flat. Further, since the cover panel 7 applied can be selected from many kinds of materials, colors, designs, etc., it would be possible to improve durability and decorationability of the input operation surface 6. Although there is a case that users may strike on the input operation surface 6 (the upper surface of the cover panel 7) with their fingers, the improvement of durability discussed hereinabove is very effective to this type of strike on the input operation surface 6.

Since the layered members placed beneath the cover panel 7 (the touch panel 2 in this embodiment) is not exposed on the uppermost surface of the keyboard device, the touch panel 2 is well protected. Still further, since the cover panel 7 can be optionally colored or added with some decorations (such as patterns) as long as operationability is not deteriorated, decorationability will be also improved.

Since the cover panel 7 of the present invention is fabricated with the semi-transparent mirror 9, during input operations, the symbol 3*a* printed on the symbol printing film 3 is hidden when the back light device 4 is turned off (when the keyboard device is not operated), and can be viewed with the floating view effects hereinabove discussed when the back light device 4 is turned on (when the keyboard device is operated). Accordingly, compared to a case where a cover panel is fabricated with only a translucent member, the floating view effects become further effective. Further, when the back light device 4 is turned off, the uppermost surface of the keyboard device (the input operation surface 6) becomes a mirror surface, it would be possible to obtain mirror-like decorative effects. At the same time, internal constituent members that are not related to input operations (such as wiring groups of the touch panel 2, the symbol printing film 3 or contours of the printing region for symbols) become hiddenable. In recent years, many kinds of semi-transparent mirrors are available in a market, so that optional semi-transparent mirrors can be selected. Accordingly, it would be possible to easily provide the keyboard device, especially the keyboard device for a personal computer, that has many different types of images (when turning off the back light device) by selecting the optional semi-transparent mirrors which appear on the uppermost surface of the keyboard device.

In one embodiment of the present invention, since the cover panel 7 of the present invention is composed of the semi-transparent mirror 9 and the translucent panel 8, it would be possible to select from many kinds of the semi-transparent mirrors and translucent panels. Accordingly, compared to a case where a cover panel is fabricated by only a semi-transparent mirror, it would be possible to modify the feature of the cover panel 7 in many different ways. For example, the most suitable material for the input operation surface 6 (the translucent panel 8) placed on the uppermost surface of the keyboard device can be selected while an optional semi-transparent mirror can be selected from many kinds thereof. Accordingly, it would be possible to easily provide the keyboard device, especially the keyboard device for a personal computer, that has many different types of images (when turning off the back light device) by selecting optional semi-transparent mirrors which appear on the uppermost surface of the keyboard device. Here, the purpose for which the semi-transparent mirror 9 is directed toward the side of the touch panel 2 is to protect the semi-transparent mirror 9. This protection effects can be maximally obtained when the filmy semi-transparent mirror 9 is laminated on the translucent panel 8. This is the reason why the material of the semi-transparent mirror 9 is relatively weaker than general materials applied to the translucent panel 8.

In the embodiment of the present invention, since a filmy semi-transparent mirror is applied to the semi-transparent mirror 9, it would be possible to modify a background color relative to the symbol 3*a* by simply exchanging the filmy semi-transparent mirror. Accordingly, a keyboard with different images can be easily produced. In case that a touch panel in an electrostatic capacity method is applied to the touch panel 2, and the filmy semi-transparent mirror contains metallic components, it may interferes operation of the touch panel whereby such a filmy semi-transparent mirror including the metallic components is not applied. Here, in case that a membrane-like semi-transparent mirror is applied, and even when a mirror membrane, in which metallic components such as aluminum evaporated films are contained, is applied, it may also interfere operations of the touch panel whereby the membrane-like semi-transparent mirror is also not used.

In the semi-transparent mirror 9 according to the embodiment of the present invention, since a dielectric (not a metallic-film) semi-transparent mirror is applied, even in a case that the semi-transparent mirror 9 is arranged on the upper surface of the touch panel 2 in the electrostatic capacity method, no interference occurs to operations of the touch panel 2. Further, the dielectric semi-transparent mirror has a feature that light with a specific wavelength is reflected, but light with the other wavelength is transmitted. This type of the dielectric semi-transparent mirror is called as a dichroic mirror (a two-color mirror). In the embodiment of the present invention, this dichroic mirror is applied as the semi-transparent mirror 9, so that the input operation surface 6 can be optionally colored. Still further, as discussed, since the dielectric semi-transparent mirror is applied as the semi-transparent mirror 9, when the keyboard device for a personal computer is not operated as an information input device (the touch panel 2 is in a non-operated condition), and only the back light device 4 is in a operated condition, a colored mirror surface according to features of dielectric multi-layer can be obtainable on the uppermost surface of the keyboard device (the input operation surface 6). Since the keyboard device for a personal computer has an input operation surface (the input operation surface 6) comparatively larger than one of the other keyboard device applied to the other electronic devices, the decoration effects achieved by the mirror surface will be noticeable.

According to the embodiment of the present invention, since a negative symbol printing film is applied as the symbol printing film 3, the plural number of symbols 3a (the symbol group 11) or the contour of printing regions of the symbol group 11 appeared on a film surface becomes viewable with the floating view effects, contributing to improvement of visibility or an outer appearance of the device. Further, since portions except the symbols 3a (background portions) become dark colors such as black where light is hardly transmitted, parts or wirings arranged beneath the symbol printing film 3 (the negative symbol printing film), or traces of a touch-up such as pin holes generated during printing can be concealed.

The symbol 3a may be printed on the touch panel 2 and the like; however, the symbol 3a is printed on a film (the symbol printing film 3) in the present invention. This is the reason why a total cost reduction is achievable in case of producing many types of keyboard devices. Specifically, by using the symbol printing film 3 that is a part individual from the touch panel 2, etc., a low cost can be consequently and totally achievable when considering work in a production line or yield in assembling. Further, the individual symbol printing film 3 may be easily applied to many kinds of products that are different in colors or designs. Still further, with variable symbol printing patterns, when the symbol 3a is printed on the basic material film, it would be possible to select a desired symbol printing pattern therefrom. Accordingly, various types of the keyboard device (with different symbols) can be easily produced. In addition, when producing the keyboard devices, it would be possible to easily cope with application of many different languages, many types of key arrangements, modification of special characters, alteration of character sizes, fonts, etc.

The touch panel 2 according to the embodiment of the present invention is a touch panel fabricated in an electrostatic capacity method. This electrostatic capacity method applied to the touch panel 2 will detect the specific position on the touch panel 2 by determining change of electrostatic capacity occurred between users' fingers and electrodes. Accordingly, this electrostatic capacity method will require the electrodes only one side of the touch panel 2. Moreover, the electrodes have been becoming more transparent in recent years. With the application of the touch panel 2 in the electrostatic capacity method according to the embodiment of the present invention, compared to a typical touch panel fabricated in a resistive film method, it would be easy to produce a touch panel that is superior to translucent features. Here, even if the touch panel 2 is arranged on the upper surface side of the symbol printing film 3, by applying the highly translucent touch panel 2 in the electrostatic capacity method, visibility of the symbol 3a on the symbol printing film 3 from the input operation surface will not be deteriorated. Accordingly, in the embodiment of the present invention, production of the touch panel 2 with high visibility would become easy, consequentially contributing to easy manufacture of the entire keyboard device.

According to the embodiment of the present invention, since there is provided the vibration motor sequentially operating through detection of users' touch to the touch panel 2, it would be possible to refrain from emanating unnecessary loud noises to surroundings whereby users can easily detect that the input operation surface 6 has been touched. Here, instead of the cover panel according to the above embodiment of the present invention, it would be possible to apply a smoke panel, or a transparent panel on which a smoke membrane or a smoke film is laminated. In case that the smoke membrane or the smoke film is applied, it would be preferable that the smoke membrane or the smoke film is arranged in a direction to the side of the touch panel whereby the membrane or the film can be well protected. Further, it would be possible to apply a touch panel formed in a method other than the electrostatic capacity method. As long as the touch panel takes a method in which functional interference is not caused due to metal, it would be possible to apply any semi-translucent mirror with a metallic film. Still further, a positive symbol printing film may be applied instead of the negative symbol printing film. According to the embodiment of the present invention, the symbol printing film can be easily selected from either in a positive condition or in a negative condition by simply exchanging the symbol printing films. Accordingly, production of the input operation surfaces with different impressions can be easily achieved. Moreover, an informing device that informs users' touch to the input operation surface may be a touch sound generation instead of the vibration motor.

In addition, some modified examples relating to the keyboard device according to the embodiment of the present invention are explained hereinbelow. In the above-described embodiment, openings are each formed at portions of the symbol film and the back light device (the surface emission layer), the portions being faced with each other. Here, it would be possible to install a fluorescent display tube (VFD or Vacuum Fluorescent Display) or a liquid crystal device into the area of the openings, so that symbols are displayable through the translucent touch panel. According to the keyboard device with the above structure, considering the main features of an input operation surface thereof (the input operation surface of the laminated body composed of the translucent touch panel, the symbol printing film and the back light device), the same effects discussed hereinabove in connection with the embodiment of the present invention can be achieved (note that a structure where the touch panel in the electrostatic capacity method is applied is excluded). On the other hand, considering the portion of the input operation surface (the portion of the input operation surface corresponding to the opening area of the symbol printing film and the back light device), it would be possible to obtain advantageous effects based on which the fluorescent display tube or the liquid crystal display device is applied. In more detail, modification of signal display contents (such as display modification between upper-case letters and lower-case letters) can be easily achieved.

Figure 4B:
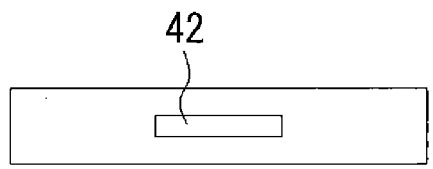
FIG. 4 illustrates one example of a controller for an electronic equipment to which the keyboard device of the present invention is applied where FIG. 4A, FIG. 4B, FIG. 4C and FIG. 4D respectively illustrate a plan view, a front view, a right-side view and a sectional view taken along the line A-A' in FIG. 4A.
Figure 4A:
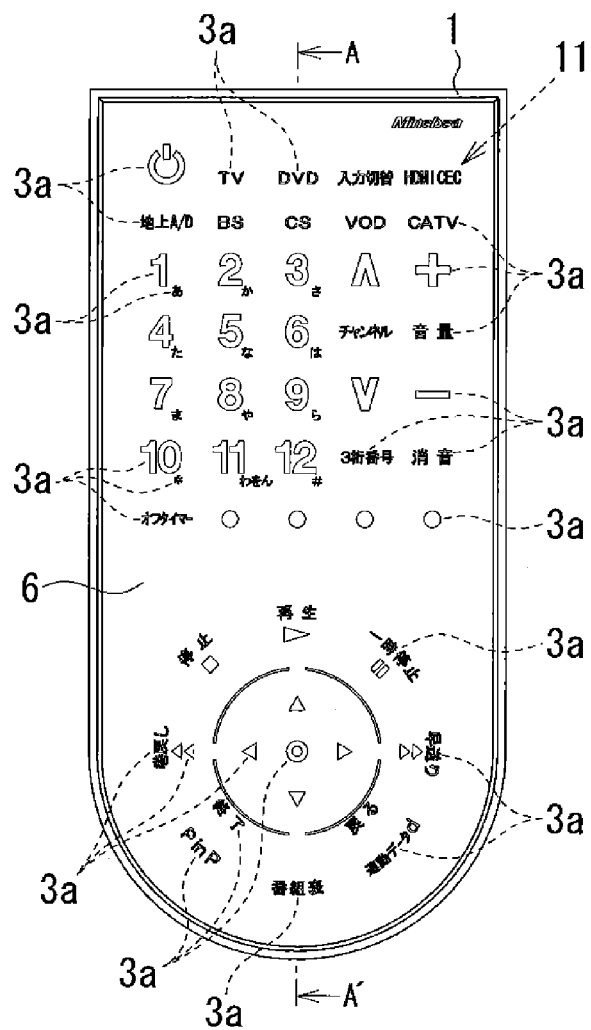
Figure 4C:
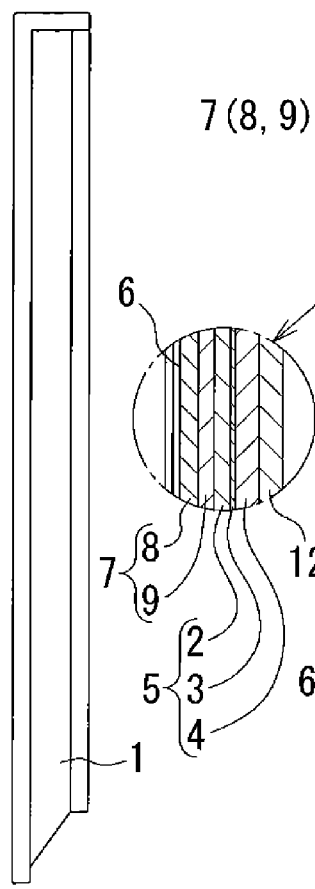
Figure 4D:
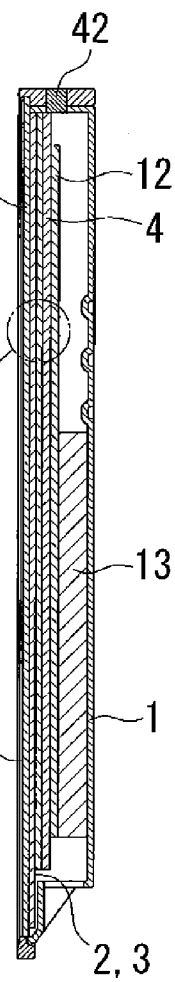
Figure 5A:
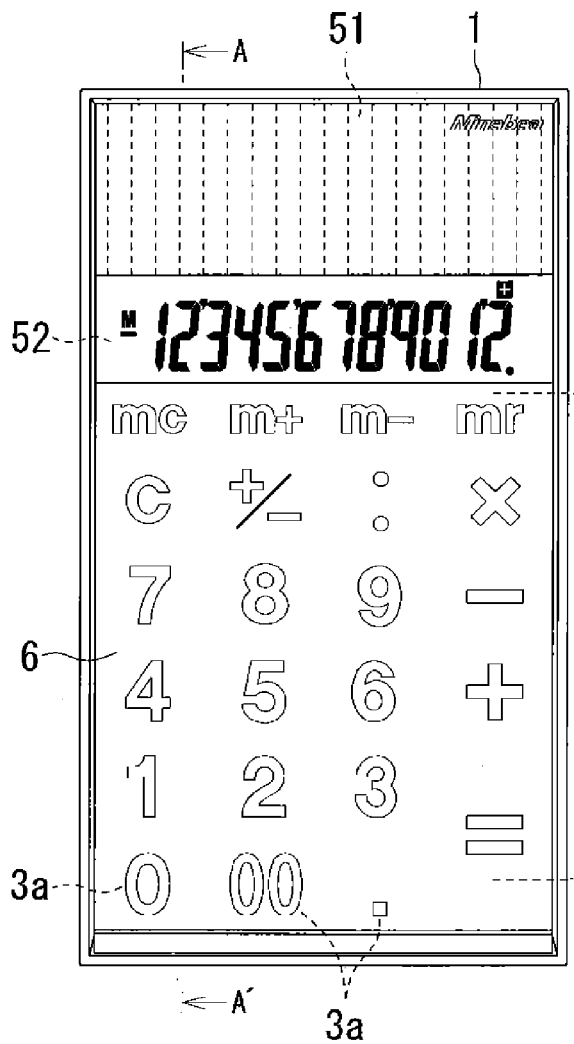
FIG. 5 illustrates one example of a desk calculator where FIG. 5A, FIG. 5B and FIG. 5C respectively illustrate a plan view, a right-side view, and a sectional view taken along the line A-A' in FIG. 5A.
Figure 5B:
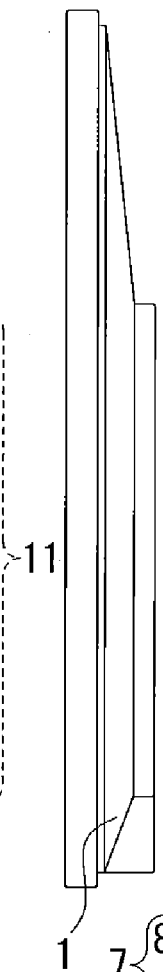
Figure 5C:
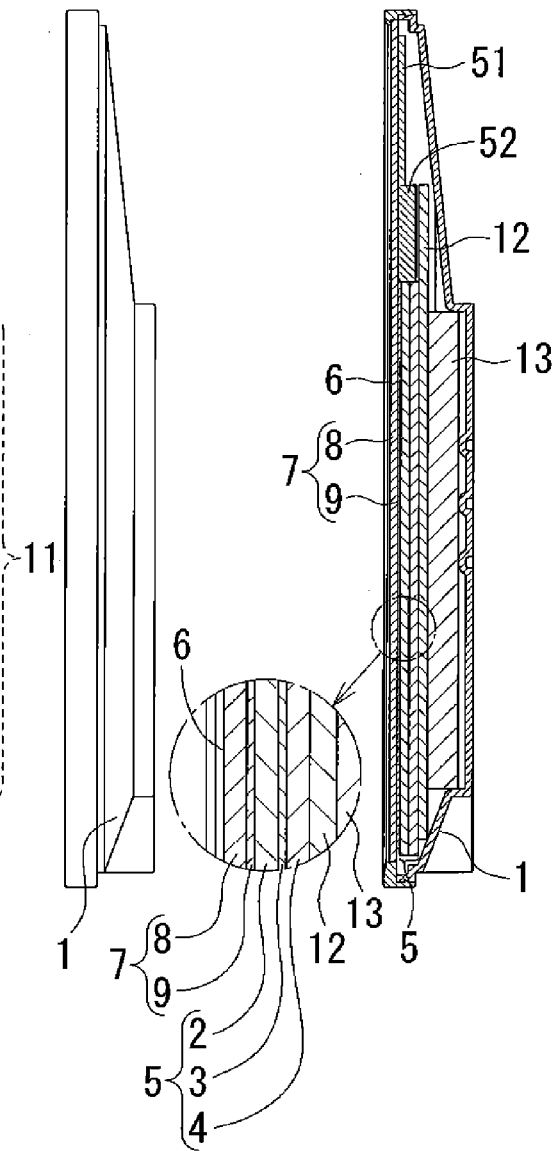

Next, examples where the keyboard device according to the embodiment of the present invention is applied to other electronic devices are given hereinbelow. FIG. 4 depicts a controller for an electronic device to which the keyboard device according to the embodiment of the present invention is applied. More specifically, one example of TV remote controller is shown. FIG. 4A is a plan view, FIG. 4B is a front view, FIG. 4C is a right-side view, and FIG. 4D is a sectional view taken along the line A-A' in FIG. 4A. FIG. 4D includes a view where one portion of FIG. 4D is expanded (see a portion surrounded by an alternate long and short dash line). FIG. 5 depicts one embodiment of a desk calculator to which the keyboard device according to the embodiments of the present invention is applied. FIG. 5A is a plan view, FIG. 5B is a right-side view, and FIG. 5C is a sectional view taken along the line A-A' in FIG. 5A. FIG. 5C includes a view where one portion of FIG. 5C is expanded (see a portion surrounded by an alternate long and short dash line). In FIGS. 4 and 5, referential numbers identical with the ones of FIGS. 1 to 3 indicate the same or corresponding parts.

As understood by FIGS. 4 and 5, the keyboard device according to the embodiment of the present invention is applied to a remote controller for television and a desk calculator. More specifically, the laminated body 5 is basically structured with, from the upper surface of the keyboard device in order, the translucent touch panel 2, the symbol printing film 3 and the back light device 4. The translucent cover panel 7 is arranged on the upper surface of the lamination body 5 (the upper surface of the touch panel 2). Accordingly, the keyboard device where the input operation surface placed on the uppermost surface of the keyboard device is flat is applied. In FIGS. 4 and 5, as the same with the keyboard device depicted in FIGS. 1 to 3, the translucent cover panel 7 is fabricated by laminating the translucent panel 8 and the semi-transparent mirror 9. The semi-transparent mirror 9 is arranged in a direction toward the touch panel 2. According to the keyboard device in which the remote controller for television or the desk calculator structured as the above is installed, it would be possible to obtain the same effects with the keyboard device as depicted in FIGS. 1 to 3. That is, as the same with the basic structure, a low cost, operationability, an outer appearance, an operational sensibility to the touch panel, and cleanliness on the input operation surface can be well achieved. Further, since the translucent cover panel 7 covers the upper surface of the touch panel 2, the cover panel 7 is fabricated by laminating the translucent panel 8 and the semi-translucent mirror 9, and the semi-transparent mirror 9 is arranged in a direction to the side of the touch panel 2, the same effects as the keyboard device as depicted in FIGS. 1 to 3 can be achieved. For example, materials, colors, design, etc. of the cover panel 7 can be easily selected through selection of the translucent panel 8. Accordingly, durability and decorationability of the input operation surface 6 is improved while an outer appearance and decorationability of the device due to the semi-transparent mirror 9 will be also improved. Needless to say, the remote controller for television as depicted in FIG. 4 and the desk calculator depicted in FIG. 5 will function as the same with general remote controllers for television and desk calculators since all necessary electronic structures (such as circuits) and mechanical structures (such as parts arrangement) are completed. Lastly, in FIG. 4, a referential number 42 indicates an output window for an infrared radiation. In FIG. 5, a referential number 51 indicates a solar battery while a referential number 52 indicates LCD (liquid crystal display device).

What is claimed is:

1. A keyboard device with a lamination body, the lamination body comprising:
    a translucent touch panel;
    a symbol printing film on which arbitrary symbols are printed;
    a surface emission layer that illuminates the symbol printing film,
    wherein the touch panel is arranged on an upper surface side of the symbol printing film, the surface emission layer is arranged on a lower surface side of the symbol printing film, and an input operation surface that is placed on the outermost surface of the keyboard device is flat.

2. The keyboard device according to claim 1, further comprising a translucent cover panel that laminates to cover an upper surface of the touch panel, an upper surface of the cover panel workable as the input operation surface.

3. The keyboard device according to claim 2, wherein the cover panel is made of a semi-transparent mirror or a smoke panel.

4. The keyboard device according to claim 2, wherein the cover panel is a lamination layer that is composed of a translucent panel and the semi-transparent mirror, and the semi-transparent mirror is directed to the side of the touch panel.

5. The keyboard device according to claim 3, wherein the semi-transparent mirror is one made of a dielectric multilayer.

6. The keyboard device according to claim 4, wherein the translucent panel is made of a translucent acrylic sheet or a translucent polycarbonate sheet.

7. The keyboard device according to claim 1, wherein the symbol printing film is made of a negative symbol printing film where the symbols are printed in a negative condition.

8. The keyboard device according to claim 1, wherein the touch panel is one fabricated in an electrostatic capacity method.

9. The keyboard device according to claim 1, further comprising a vibration motor that is sequentially to be operable when detecting users' touch to the touch panel.

10. The keyboard device according to claim 1, the symbol printing film and the surface emission layer each partially have openings at their portions that face to each other wherein a fluorescent display tube or a liquid crystal display device is installed within a region of the openings making the symbols viewable through the translucent touch panel.

11. A keyboard device for a personal computer wherein the keyboard device recited in claim 1 is applied.

12. A controller for an electronic equipment wherein the keyboard device recited in claim 1 is applied.

13. A desk calculator wherein the keyboard device recited in claim 1 is applied.

* * * * *